United States Patent [19]
Gillett

[11] 3,880,543
[45] Apr. 29, 1975

[54] JIG

[76] Inventor: Albert Gillett, 3 Madge Hill Church Rd., Hanwell, England

[22] Filed: Aug. 7, 1973

[21] Appl. No.: 386,331

[30] Foreign Application Priority Data
Aug. 16, 1972 United Kingdom............... 38247/72

[52] U.S. Cl. ............................................. 408/109
[51] Int. Cl. ........................................... B23b 39/00
[58] Field of Search .......... 408/108, 109, 115, 103; 269/288, 87.3; 145/129

[56] References Cited
UNITED STATES PATENTS

| | | | |
|---|---|---|---|
| 863,941 | 8/1907 | Robbins | 408/103 X |
| 1,161,479 | 11/1915 | Kelley | 408/109 |
| 2,497,733 | 2/1950 | Kebour | 408/109 |
| 2,804,788 | 9/1957 | Humphrey | 408/115 X |

Primary Examiner—Harrison L. Hinson
Attorney, Agent, or Firm—Norris & Bateman

[57] ABSTRACT

A jig for drilling holes in wood, particularly where a series of holes is required when sinking a mortice, comprising a tool body on which is mounted an adjustable static clamping face and which acts as a guide, a hand retained clamping arm for holding the wood to be morticed between against the static clamping face and a guide member with a central drill guide bore mounted with axis of the bore parallel to the plane of the clamping face, wherein the drill guide locates a drill of preferably a hand held power drilling machine.

4 Claims, 3 Drawing Figures

JIG

The present invention relates to a jig primarily intended for sinking a mortice in wood, but which may be used in a restricted way for dowelling.

The accurate sinking of a mortice, being the female element of the mortice and tenon joint, is an operation demanding a high degree of skill and much practice. In a common method of sinking a mortice and one which is becoming more usual with the advent of power driven drills, is to drill a number of holes, preferably contiguous, and removing the material between the holes with a chisel. Before drilling the holes, the mortice has to be accurately marked out with a centre line along which the holes must be drilled. Such marking out clearly involves time and care. When drilling the holes after marking out, it is important that the holes are accurately aligned relative to the surface in which they are drilled. Certain kinds of wood have a gain which tends to make a drill wander and result in a number of drill holes which are not parallel and may not be in the mortice plane.

It has been proposed to use a dowelling jig which has been on the market for sometime, in order to guide a drill in the correct alignment. However, a dowelling jig as such is not particularly suitable for use since it is a relatively complex tool which cannot be readily held in one hand whilst drilling a hole with the other hand. Furthermore, dowelling jigs are normally located on the workpiece by means of a screw clamp which must be unscrewed and screwed back again when a further hole is to be bored. Such dowelling jigs have a clamping screw with a relatively small head and this if much pressure is applied can result in the wood being marked by crushing.

An object of the present invention is to provide a tool suitable for being held in one hand whilst clamping to a workpiece, suitable for use with hand held power drills and which overcomes or reduces the above disadvantages.

The present invention consists in a jig for boring holes in wood comprising a tool body to which is adjustably and/or removably fixed a drill guide member, a static clamping face, and a hand retained clamping arm located on the tool body in an opposed position to the static clamping face, the guide member being located so that the workpiece held between the clamping arm and clamping face can have a hole drilled in the workpiece by insertion of the drill through the guide member.

Such a jig is designed to produce a sequence of like sized holes parallel with a face of the workpiece, these holes being converted to a rectangular mortice slot by cutting along the crown of the bore holes and squaring off with a wood chisel. The jig according to the invention can be used with a hand held power drill, the jig being held in one hand and the power drill being held in the other hand.

In the accompanying drawings, which show an embodiment of the invention according to one convenient mode;

Figure 1:
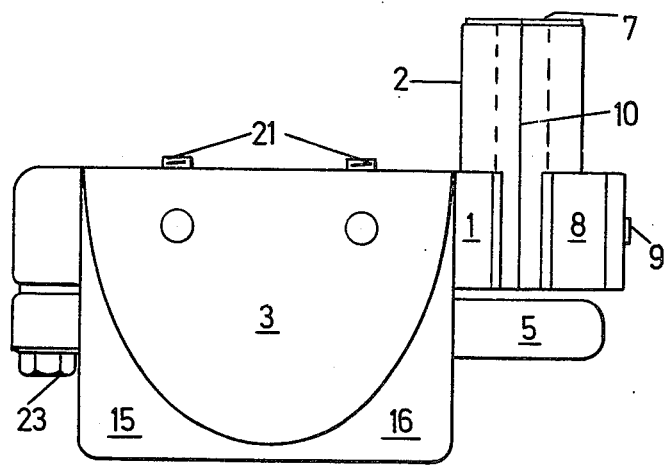
FIG. 1 is a front view of the jig according to the invention.
Figure 2:
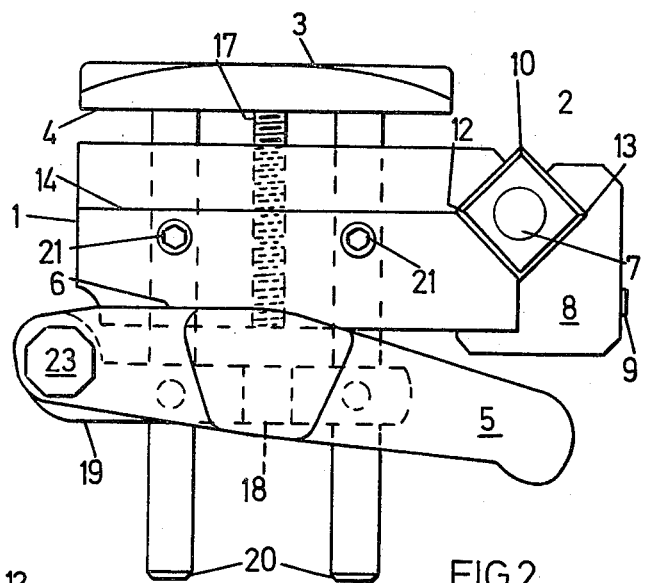
FIG. 2 is an underside view of the jig as shown in FIG. 1.
Figure 3:
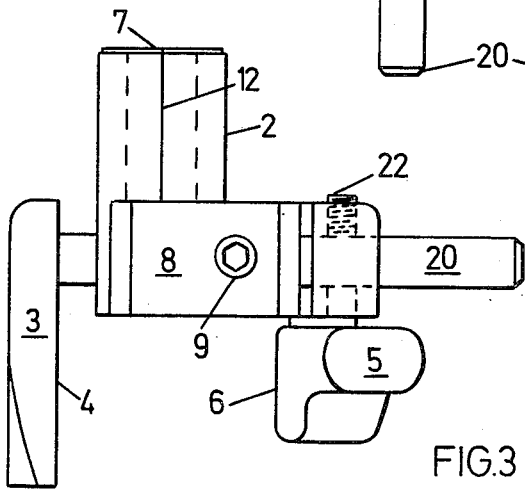
FIG. 3 is an end view of the jig according to the invention.

Referring to the drawings a jig for boring holes in wood according to the invention may be seen which comprises a tool body 1 to which are adjustably and/or removably fixed a drill guide member 2, a static clamping member 3 having a static clamping face 4, and a hand retainable clamping arm 5. The clamping arm 5 has a clamping face 6 which is in an opposed position to the clamping face 4 and between which faces a workpiece (not shown) may be held when boring holes by means of inserting a drill through the hole 7 in the guide member 2.

The drill guide member 2 is clamped to the tool body 1 by means of a hold fast 8, which is secured by an Allen screw 9 which screws through the holdfast 8 into the tool body 1. The guide member 2 is made of steel and is supplied with the holes 7 in several sizes ranging in the present embodiment from one-fourth inch to one-half inch. This enables different mortice widths to be bored. Each guide member 2 has an exterior square cross-section of the same size, the angle 10 of which being used for aligning the drill onto a mark on the workpiece, the angles 12 and 13 being useful to align the drill with the drilling centreline marked on the workpiece. The drilling centreline is represented on the tool body 1 by a datum mark 14, which can be used to measure the distance between the face 4 and the drilling centreline when setting up the jig.

The static clamping member 3 which adjustably located on one side of the tool body 1 is suitably rounded off at 15 and 16 for comfortable fitting into the palm of the operators hand. Adjustment for moving the clamping member clamping face 4 towards or away from datum mark 14 is obtained by screwing in or out an adjusting screw 17. Access to the head of the screw 17 is obtained through a hole 18 in a supporting member 19 on which is pivotally mounted the clamping arm 5. The clamping face 4 is kept paralled to the datum line 14 by means of two guide bars 20 fixed to and projecting from member 3. These bars 20 can be locked to body 1 by Allen screws 21 set into the tool body 1. Scales can be provided on the bars 20 so that a metric scale is on one bar and inches and fractions on the other bar.

The clamping arm 5 is also adjustably located on the tool body 1 opposite to the clamping member 3. Provision for adjustment parallel to the datum mark 14 is obtained by sliding the supporting member 19 on the bars 20 and locking the supporting member 19 to the bars 20 by means of Allen screws 22. The arm 5 is pivoted at 23 so as to allow the face 6 to be brought into or out of engagement with a workpiece. Although the tool is shown as being suitable for a right handed user, member 19 and arm 5 could easily be made to reverse so as to be more suitable for a left handed user.

In use the tool is set up by slacking off Allen screws 21 and 22 and, having fitted the required size of drill guide member 2, the tool is set on the workpiece, e.g. a stile for a door. The datum line is then positioned on the centre line of the mortice and the clamping faces 4 and 6 pushed into engagement with the workpiece and locked by tightening the Allen screws 21 and 22. The tool is next aligned at the start of the mortice by using the angle 10 which indicates the centre line of a drill fitted in the hole 7. The tool is then held fast to the workpiece by manual pressure on arm 5 and a drill fitted in a power tool inserted in the guide member 2. When the first hole has been drilled in the workpiece, the tool is easily shifted along the centre line of the mortice by releasing the manual pressure on arm 5. Thereby achieving a quick and accurate row of holes which can be converted to a typical rectangular mortice slot by cutting along the crowns of the boreholes and squaring off the end with wood chisels. Little skill is thus required to obtain an accurate result.

Other advantages are that the boring can be done without stopping or removing the bit from the guide, that the clamp face is designed to give a large clamping area so as to obtain a firm grip with no risk of marking the workpiece.

Bit guides are provided in the present embodiment from one-fourth to one-half by one-sixteenth inch and this tool is designed to cater for wood stiles from ¾ inch to 2⅛ inch.

1 claim:

1. A manually operable jig for use in drilling holes in a wooden or like workpiece comprising a jig body, a drill guide member fixed on said body, a workpiece clamping wall disposed at one side of the body, a workpiece clamping arm support disposed at the opposite side of said body and a clamping arm pivoted on said support for movement toward or from a workpiece disposed between said wall and said arm, means for adjusting said wall relative to said body and locking it in any adjusted position, means for adjusting said clamping arm support relative to said body toward or away from said wall and locking it in any adjusted position, said clamping arm being manually operable to engage one side of edge of a workpiece introduced between said wall and arm and tightly urge the other side edge against said wall to grip the workpiece while the operator inserts a drill through said guide member to drill a hole in said workpiece.

2. A manually operable jig as defined in claim 1, wherein means is provided for maintaining the inner workpiece engaging face of said wall parallel to a datum line on said body during said adjustment of said wall.

3. A manually operable jig as defined in claim 2, wherein said means for maintaining parallelism of said face and datum line comprises guide rod means extending from said wall slidably through said jig body, and wherein means is provided for locking said body to said rod means to fix the wall in adjusted position.

4. A manually operable jig as defined in claim 3, wherein said clamping arm support is slidably mounted on said rod means beyond said body, and means is provided for locking said adjusted support to said rod means.

* * * * *